July 26, 1938.  G. H. MAINS  2,125,076
PROCESS OF PRODUCING PIGMENTED PAPER AND IMPREGNATING IT
WITH A RESINOUS BINDER AND THE PRODUCT
Filed Dec. 12, 1933
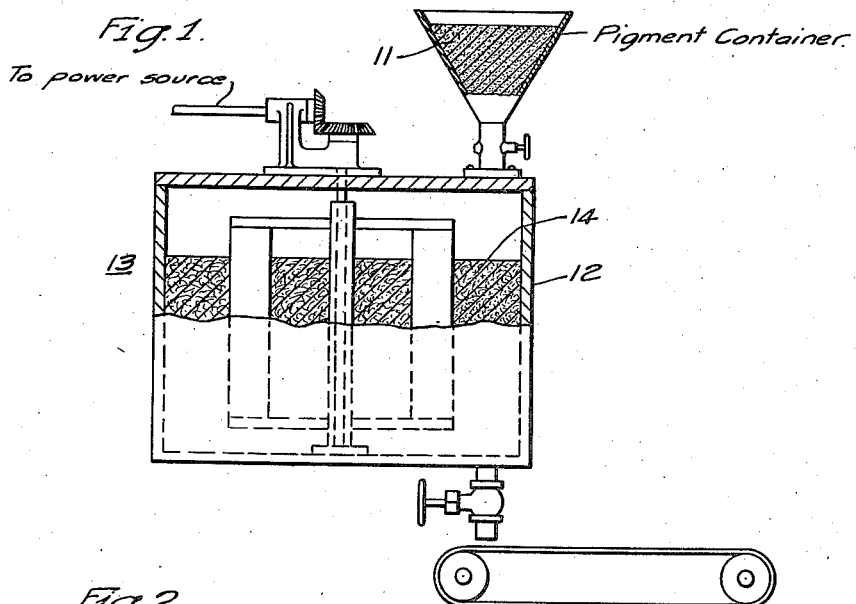
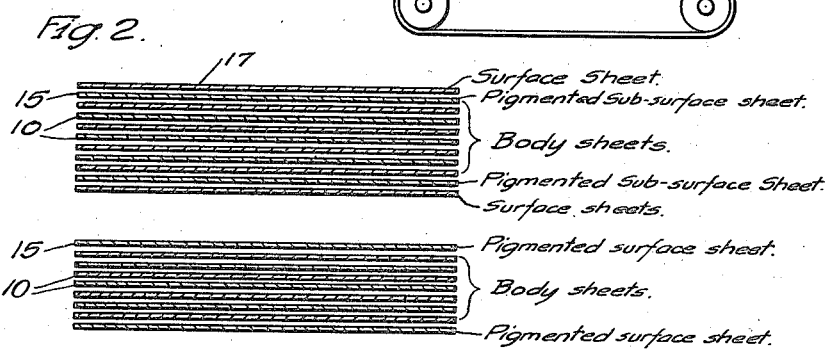
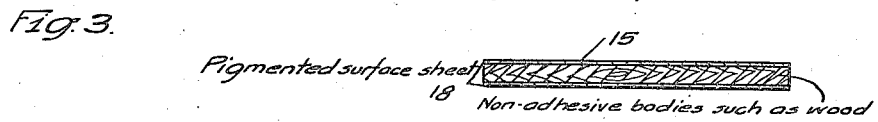
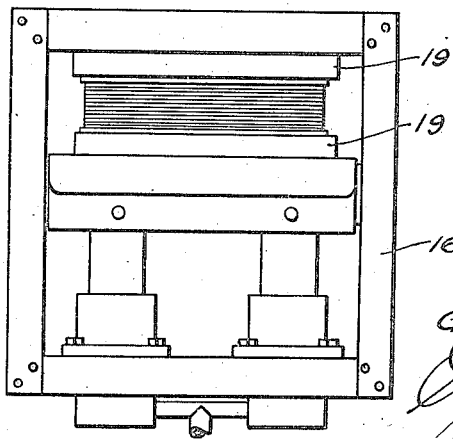
WITNESSES:
INVENTOR
Gerald H. Mains.
BY
ATTORNEY Patented July 26, 1938

2,125,076

UNITED STATES PATENT OFFICE 2,125,076

PROCESS OF PRODUCING PIGMENTED PAPER AND IMPREGNATING IT WITH A RESINOUS BINDER AND THE PRODUCT

Gerald H. Mains, Murrysville, Pa., assignor to Westinghouse Electric & Manufacturing Company, East Pittsburgh, Pa., a corporation of Pennsylvania Application December 12, 1933, Serial No. 702,022

9 Claims. (Cl. 154—2)

The invention relates generally to a process for making pigmented fibrous sheets impregnated with a resinous binder and utilizing these sheets to make colored or ornamented molded products.

In the manufacture of molded products when phenolic resins are employed as the binder, the article produced is likely to have a yellowish or straw colored tint. Such tints are generally undesirable and render the article less appealing to the trade.

Many processes for producing impregnated pigmented fibrous sheets and laminated products of predetermined colors or presenting selected designs and colors have been tried, but heretofore great difficulty has been experienced in producing a satisfactory product or employing these processes on a commercial manufacturing scale. For example, the treating of paper sheets with pigmented phenolic resins or varnishes to give a desired color and render them opaque to adapt them for use as surface or sub-surface sheets in laminated products cannot be carried out with any great degree of success because the high viscosity of the pigmented resins make it difficult to obtain a uniform impregnation and coating of the sheets. When such a process is employed the surfaces of the paper are merely coated but the body is not thoroughly impregnated. Attempts to impregnate pigmented paper such as known in the printing trades with a resinous binder have failed because the pigmented sheets are hard and non-porous and the resins do not penetrate them. When sheets prepared in accordance with these processes are employed to make laminated molded products, the surface coats of the resinous binders will unite with the next adjacent sheets when subjected to heat and pressure, but as soon as the pressure is relieved, the coated sheet is liable to split along a central plane parallel with the surface planes. This is sometimes called blistering.

When pigmented phenolic resins are employed for treating sheets, it is very difficult to keep the resin solutions in proper condition for carrying on the process because of their tendency to increase in viscosity and to polymerize rapidly.

An object of the invention is to provide for the manufacture of pigmented sheets impregnated with resinous binders and molded products of a predetermined color.

The invention accordingly comprises the several steps and the relation and order of one or more of such steps with respect to each of the others, and the article possessing the features, properties, and the relation of elements, which are exemplified in the following detailed disclosure and the scope of the application of which will be indicated in the claims.

For a fuller understanding of the nature and object of the invention, reference should be had to the following detailed description taken in connection with the accompanying drawing, in which:

Figure 1 is a view in side elevation of a beater such as may be utilized in the paper making art and means for introducing an inorganic pigment into the beater to be mixed with the paper stock during the beating operation.

Fig. 2 is a view in side elevation of an exploded stack of pigmented impregnated sheets prepared and arranged in accordance with this invention.

Fig. 3 is a view similar to Fig. 2 with a different arrangement of pigmented impregnated sheets.

Fig. 4 is a view in side elevation of pigmented impregnated sheets as they would be arranged for molding with non-adhesive bodies or bodies of molding compositions of fibrous materials and synthetic resins, and Fig. 5 is a diagrammatic view of pressing plates suitable for molding the stacks of sheets illustrated in Figs. 2 to 4, inclusive.

In the present invention, a plurality of sheets of any suitable fabric or paper are impregnated with a phenolic, urea or other resin that may be readily molded. These sheets are superimposed on one another to form a body stack of the desired size.

In order to prevent the body sheets from giving the final product a tint, an opaque sheet may be employed. This opaque sheet may be utilized as a surface sheet or sub-surface sheet, the uses of which will be explained hereinafter.

In this embodiment of the invention, the opaque sheet employed for a surface or sub-surface sheet is produced by intimately mixing a predetermined amount of an inorganic pigment of a desired color with paper stock or pulp during the beating operation in the paper making process. The quantity of pigment dispersed throughout the paper will depend on the conditions to be met in the final product.

The quantity of pigment that will be used will depend on the character of the raw materials employed, the length of time the beating process is continued and the porosity required to enable the pigmented paper to absorb a predetermined amount of the resinous binder during the impregnating process.

It has been found that for most purposes, 10% to 20% by weight of a pigment, such as titanium oxide, is sufficient to mix with stock during the beating operation in the paper making process to render a sheet approximately 5 mils thick opaque and to maintain sufficient porosity or capacity for absorbing a resinous binder. It is to be understood that these quantities of inorganic pigments are not the limits because 2% by weight of a pigment has been found very serviceable for many purposes. The proportion of pigment required to obtain desired opacity will vary with the thickness of the paper.

The pigmented sheets will be impregnated with some suitable binder such as urea, phenolic, vinyl, or sugar type resin to adapt them for molding. The quantity of resin embodied in the sheet will depend on the conditions to be met.

When it is desired to produce a molded laminated product of a predetermined color, an opaque sheet embodying the proper pigment to give it the desired color may be utilized as the finishing or surface sheet. If it is desired to finish the molded laminated product to present a figure or design, this figure or design may be printed directly on the pigmented sheet.

The pigment employed will depend on the color it is desired to produce. If a white opaque sheet is required, some suitable white pigment such as titanium oxide having a high covering capacity will be introduced into the paper stock during the beating process. Other pigments that have been utilized with success are oxides of iron, which produce a reddish color, chromium oxide, which renders the sheet green, and oxide of lead, which gives the paper a yellow color. Certain chromates and other salts which will not decompose under the molding temperature may also be utilized as pigments. By making proper combinations of these inorganic pigments and introducing them into the paper stock during the beating process, many different colors may be produced.

In order to secure a wide variety of tints in the final product, dyes and pigments may be mixed into the pulp during the beating process. For example when a fast black dye and a predetermined amount of titanium oxide are mixed with the paper stock in the beating process, a gray paper is obtained which will retain its color during the molding process and during subsequent exposure to light.

In making certain finishing or surface sheets good results are obtained by employing such a small percentage of pigment that the sheet will be semi-translucent. A sheet having a low pigment content may be impregnated and used in conjunction with an opaque sub-surface sheet of predetermined color to give the article a desired tint after molding.

Referring now to Figs. 1 to 3, inclusive, the sheets of paper 10 are impregnated with a phenolic or urea resin in order to adapt them to be molded into a unitary structure. The selection of the resin for the binder will depend on the requirements of the final product.

The opaque colored sheet is made by introducing some suitable pigment 11 into the beater 12 of the paper making machine 13 to mix it with the pulp or stock 14. By introducing a predetermined amount of pigment into the stock and operating the beater for a predetermined time, they will be so intimately and thoroughly mixed that sheets made from the mixture will be opaque and of the desired color.

In the making of a white opaque sheet from alpha cellulose, from 10% to 20% by weight of titanium oxide may be added to the stock during the beating process. It has been found that when this quantity of titanium oxide is employed the paper will remain sufficiently porous to receive enough of a resinous binder to adapt the sheet for molding. The pigmented sheet will ordinarily be impregnated with the same resinous binder as the body sheets, but this practice is not always required.

When it is desired to produce a molded product of a predetermined color, an opaque colored sheet 15 is superimposed on the sheets 10, and the stack is subjected to heat and pressure between the heated pressing plates of a press 16 until it is molded into a single mass or unitary structure of a predetermined size and shape.

In case it is desired to produce an article presenting a design, a transparent or translucent sheet of paper 17 having the design printed thereon is impregnated with the same resinous binder as the opaque sheet. This sheet 17 is then superimposed on the opaque sheet 15, which may be made of any desired color and the two placed on the stack of sheets 10. The whole stack of sheets is then molded into the desired product in the press 16.

In some cases the design may be printed on the opaque sheet. In this manner, a design backed by a sheet having a desired color may be produced readily.

In many cases it may be desirable to provide surface sheets 15 and opaque sheets 17 on both sides the stack. However, this will be a matter of arrangement which will be decided by the manufacturer.

The applications of pigmented impregnated sheets are not to be limited to use in combination with sheets impregnated with resinous binders. Pigmented impregnated sheets 15 may as readily be molded to non-adhesive bodies 18, such as metals, woods, asbestos sheets and composite fibrous boards and to bodies such as molding compositions of fibrous materials and synthetic resins. The sheet will be arranged as shown in Fig. 4. In all cases, the pigmented impregnated sheets may be employed in finishing the article being manufactured. In some instances the pigmented impregnated sheets may be applied to give a desired finish to the article, while in others to increase its durability.

In addition to the above uses, pigmented sheets if properly impregnated because of their fast colors and resistance to water and chemical action will meet many of the demands for opaque and colored sheets that arise in the packaging and decorating arts. In the building industry, sheets prepared in accordance with the teachings of this invention may be utilized for decorative panels and for many other purposes.

The molding of the sheets between pressing plates 19 of the press 16 may be performed by applying heat and pressure in accordance with practices well known in the art, and an explanation of the details will not be given.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

I claim as my invention:

1. A molded laminated product comprising a plurality of sheets of paper impregnated with a resinous binder suitable for molding, a sheet of paper having a pigment dispersed throughout the body thereof and impregnated with a resinous binder superimposed on the other sheets, all of the sheets being molded into a unitary structure.

2. A molded laminated product comprising a plurality of sheets of paper impregnated with a resinous binder suitable for molding, a sub-surface sheet of paper having a pigment dispersed throughout the body thereof and impregnated with a resinous binder, and a surface sheet of paper impregnated with a resinous binder superimposed on the sub-surface sheet, all of the sheets being molded into a unitary structure.

3. A molded laminated product comprising a plurality of sheets of paper impregnated with a synthetic resinous binder, a sub-surface sheet of paper having a pigment dispersed throughout the body thereof and impregnated with a synthetic resinous varnish superimposed on the other sheets, a surface sheet of paper impregnated with a resinous varnish superimposed on the sub-surface sheet, all of the sheets being molded into a unitary structure.

4. A molded laminated product comprising a plurality of sheets of paper impregnated with a urea resin suitable for molding, a surface sheet of paper having a pigment dispersed throughout the body thereof which renders it opaque and gives it a predetermined color impregnated with urea resin, all of the sheets being molded into a unitary structure.

5. A molded laminated product comprising a plurality of sheets of paper impregnated with a urea resin, a sub-surface sheet of paper having a pigment dispersed throughout the body thereof rendering it opaque and giving it a color, said sub-surface sheet being impregnated with a urea resin, the sub-surface sheet being superimposed on the other sheets, and a surface sheet impregnated with urea resin superimposed on the sub-surface sheet, all of the sheets being molded into a unitary structure.

6. A laminated product comprising a plurality of sheets of paper impregnated with a synthetic binder to form a body, a sheet of paper having a pigment of a predetermined color dispersed throughout the body thereof rendering it opaque, said pigmented sheet being impregnated with a resinous binder and a finishing sheet of paper embodying pigment of a predetermined color, said finishing sheet being impregnated with a resinous binder.

7. A molded laminated product comprising a plurality of sheets of cellulosic material impregnated with a resinous binder suitable for molding, a sheet of cellulosic paper having a pigment dispersed throughout its body, the quantity of pigment being so selected that the paper retains a predetermined porosity, said pigmented porous sheet being impregnated with a resinous binder and superimposed on the other sheets, all of the sheets being molded into a unitary structure.

8. In the manufacture of composite molded sheet materials having a decorated surface on an opaque background, the features of decorating a paper sheet, containing pigment homogeneously distributed between its fibers with a design, treating it with a binder and finally consolidating the resultant decorated surface sheet inseparably with a support by a hot molding operation.

9. A composite, molded sheet material bearing a decorated opaque binder impregnated surface sheet containing a pigment homogeneously distributed between the fibers, which has been produced by decorating a paper sheet containing pigment homogeneously distributed between its fibers with a design, treating it with a binder and finally consolidating the resultant decorated surface sheet inseparably with a support by a hot molding operation.

GERALD H. MAINS.